(12) United States Patent
Nichols, Jr.

(10) Patent No.: US 11,724,347 B1
(45) Date of Patent: Aug. 15, 2023

(54) DUST SHROUD ASSEMBLY FOR A CHIPPING HAMMER

(71) Applicant: Kraig D. Nichols, Jr., Port Saint Lucie, FL (US)

(72) Inventor: Kraig D. Nichols, Jr., Port Saint Lucie, FL (US)

( * ) Notice: Subject to any disclaimer, the term of this patent is extended or adjusted under 35 U.S.C. 154(b) by 0 days.

(21) Appl. No.: 18/128,435

(22) Filed: Mar. 30, 2023

Related U.S. Application Data

(60) Provisional application No. 63/359,916, filed on Jul. 11, 2022.

(51) Int. Cl.
*B23Q 11/00* (2006.01)
*B25D 17/20* (2006.01)

(52) U.S. Cl.
CPC .......... *B23Q 11/0046* (2013.01); *B25D 17/20* (2013.01); *B25D 2217/0065* (2013.01)

(58) Field of Classification Search
CPC ............ B23Q 11/0046; B23Q 11/0071; B25D 2217/0065
See application file for complete search history.

(56) References Cited

U.S. PATENT DOCUMENTS

| | | | |
|---|---|---|---|
| 2,122,507 A | 3/1937 | Ball | |
| 2,843,929 A | 7/1958 | Morgan et al. | |
| 4,361,957 A | 12/1982 | Krotz et al. | |
| 4,491,444 A * | 1/1985 | Rumpp | B25D 17/088 409/234 |
| 4,955,984 A | 9/1990 | Cuevas | |
| 5,137,096 A | 8/1992 | Druesdow | |
| 5,160,230 A | 11/1992 | Cuevas | |
| 5,199,501 A | 8/1993 | Kluber et al. | |
| 5,467,835 A | 11/1995 | Obermeier et al. | |
| 6,053,674 A | 4/2000 | Thompson | |
| 6,145,555 A | 11/2000 | O'Neill | |
| 7,740,086 B2 | 6/2010 | Bleicher et al. | |
| 8,409,310 B2 | 4/2013 | Despineux et al. | |
| 8,578,554 B2 | 11/2013 | King, Jr. | |
| 8,793,835 B2 | 8/2014 | King, Jr. | |
| 8,967,923 B2 | 3/2015 | Lerch et al. | |
| 9,579,762 B2 | 2/2017 | Sullivan | |
| 2007/0193759 A1 | 8/2007 | Sweig et al. | |
| 2009/0193614 A1 | 8/2009 | Moore et al. | |
| 2012/0142263 A1 | 6/2012 | Burdick et al. | |
| 2012/0210535 A1 | 8/2012 | Miwa et al. | |
| 2023/0070889 A1 * | 3/2023 | Balvanz | B23B 45/003 |

* cited by examiner

*Primary Examiner* — Daniel Jeremy Leeds
(74) *Attorney, Agent, or Firm* — Glenn E. Gold, P.A.; Glenn E. Gold

(57) ABSTRACT

A dust shroud assembly releasably attachable to the working end of a chipping hammer includes a chipping hammer bit chamber having a vacuum port extending exteriorly therefrom, an end cap releasably attachable to a distal end of the chipping hammer bit chamber, a dust shroud sleeve slidingly contained within an interior of the chipping hammer bit chamber, and an attachment collar for releasably attaching a proximal end of the chipping hammer bit chamber to the working end of a conventional chipping hammer device about a quick change chipping hammer drill chuck.

17 Claims, 5 Drawing Sheets ical patent application claims the benefit
DUST SHROUD ASSEMBLY FOR A CHIPPING HAMMER

CROSS REFERENCE TO RELATED APPLICATIONS

This non-provisional patent application claims the benefit of U.S. provisional patent application No. 63/359,916, filed on Jul. 11, 2022, by the same inventor.

FIELD OF THE INVENTION

The present invention relates generally to dust extraction attachments (i.e., dust shrouds) for chipping hammers. More particularly, the invention pertains to a chipping hammer dust shroud assembly which, once installed, does not have to be disassembled from the chipping hammer in order to exchange one chipping hammer bit for another chipping hammer bit.

BACKGROUND OF THE INVENTION

The practice of chipping, chiseling, scaling and/or scraping up various old debris like tile, mortar, and old coatings from concrete, brick, wood and other substrates in order to clean up the surface is well known. An existing problem is that there is a substantial amount of dust created during the aforementioned processes. The dust created from broken tile, mortar, and other cement products becomes airborne and becomes a health hazard. For this reason, costly and time-consuming precautions are commonly taken such as the use of respirators, draping off work areas, etc.

Devices that work in unison with demolition tools to collect dust are well known. For example, dust extraction attachments, or dust shrouds, are commonly used in conjunction with chipping hammers. Generally, a dust shroud is attached to the working end of the chipping hammer to draw dust in, via vacuum, during a concrete chipping operation. One known problem with conventional chipping hammer dust shrouds is that they must be removed, or detached, from the chipping hammer in order to replace one chipping hammer bit with another. This is necessary in order to access the quick change, or quick release, mechanism of the drill chuck in order to remove an existing attached chipping hammer bit, and to subsequently attach a different chipping hammer bit. This is a time-consuming and inefficient procedure, which wastes valuable time during a demolition job at a work site.

What is therefore needed is a chipping hammer dust shroud assembly that does not require removal in order to switch out one chipping hammer bit for another. Furthermore, it would be highly desirable to provide a solution in which existing conventional chipping hammer dust shroud designs could be slightly modified and retrofitted with a unique internal dust shroud sleeve.

SUMMARY OF THE INVENTION

A dust and debris extraction assembly, alternatively referred to herein as a "dust shroud assembly," is hereby disclosed that may be attached to the working end of a chipping hammer or similar machining device. The dust shroud assembly includes a chipping hammer bit chamber having a vacuum port extending exteriorly therefrom, an end cap releasably attachable to a distal end of the chipping hammer bit chamber, a dust shroud sleeve assembly slidingly contained within an interior of the chipping hammer bit chamber, and an attachment collar assembly for releasably attaching a proximal end of the chipping hammer bit chamber to the working end of a conventional chipping hammer tool about a quick change chipping hammer drill chuck.

Once the dust shroud assembly has been fully assembled and secured to the working end of the chipping hammer, a distal end of the chipping hammer drill chuck is seated within a rear opening, or cavity, of a dust shroud sleeve body. The dust shroud sleeve body is longitudinally translatable within the chipping hammer bit chamber, along a central axis thereof, via manual manipulation of a pair of radially offset dust shroud sleeve biasing members extending outwardly from an exterior surface of the dust shroud sleeve body, through a corresponding pair of radially offset elongated lateral openings in a chipping hammer bit chamber housing.

Upon retracting the dust shroud sleeve body (i.e., rearwardly) within the chipping hammer bit chamber housing, via the dust shroud sleeve biasing members extending outwardly through the elongated lateral openings, a rear portion of the dust shroud sleeve engages a retractable collar of the quick change chipping hammer drill chuck, thereby biasing it into an open state, or condition, to enable a shank portion of a chipping hammer bit to be inserted into, or removed from, a main body of the chipping hammer drill chuck without requiring prior detachment of the dust shroud assembly from the working end of the chipping hammer.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
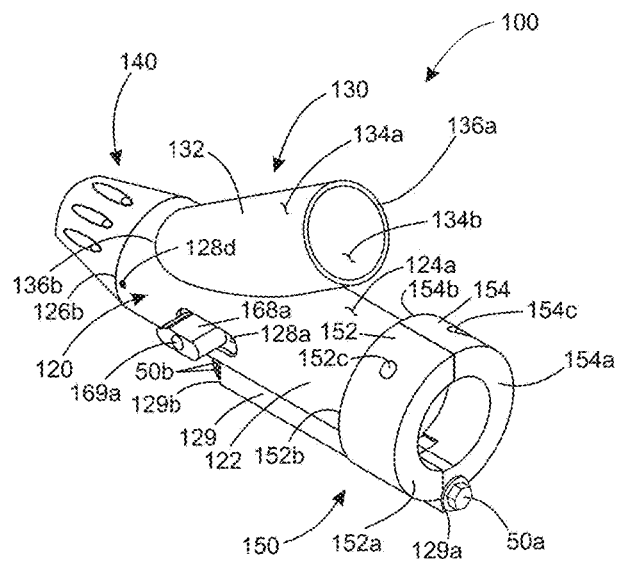
FIG. 1 is an upper-left-rear isometric view of a fully-assembled dust shroud assembly 100 (with mechanical fastening components 52, 54 and 56 removed to better identify various drawing features) in accordance with an exemplary implementation of the invention.
Figure 2:
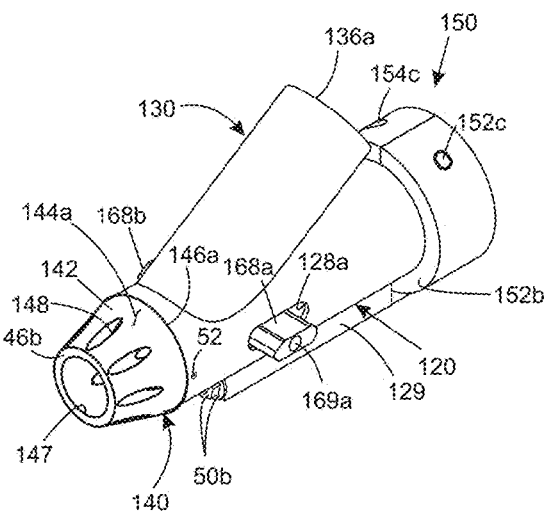
FIG. 2 is an upper-left-front isometric view of the dust shroud assembly 100 originally introduced in FIG. 1.
Figure 3:
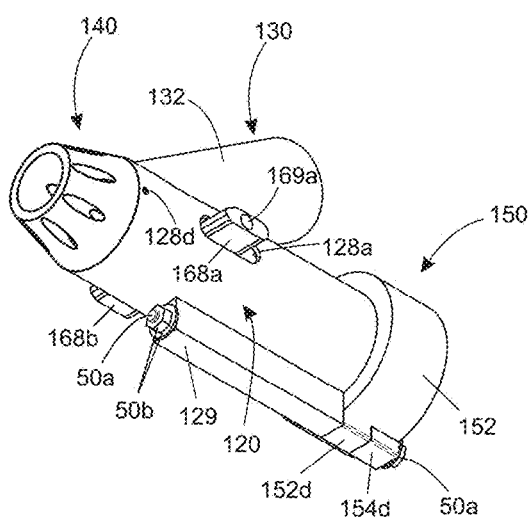
FIG. 3 is a lower-left-front isometric view of the dust shroud assembly 100 originally introduced in FIG. 1.
Figure 4:
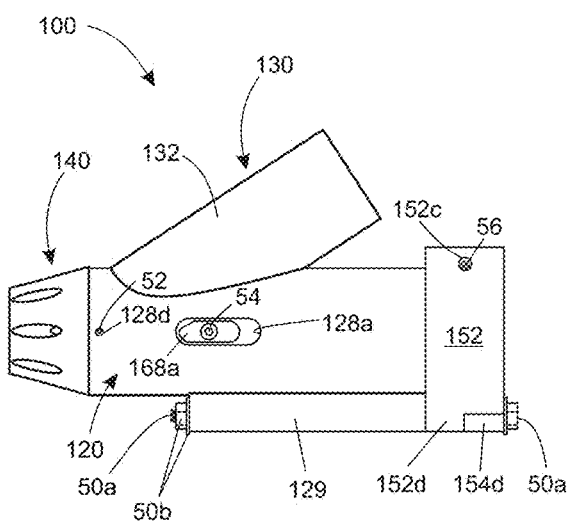
FIG. 4 is a left side elevation view of the dust shroud assembly 100 originally introduced in FIG. 1 (with fasteners 52, 54 and 56 shown)
Figure 5:
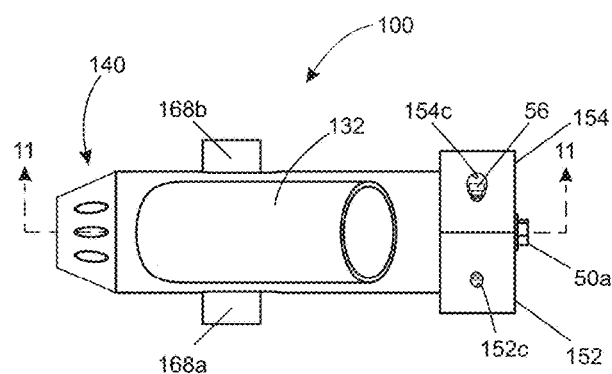
FIG. 5 is a top plan view of the dust shroud assembly 100 originally introduced in FIG. 4.
Figure 6:
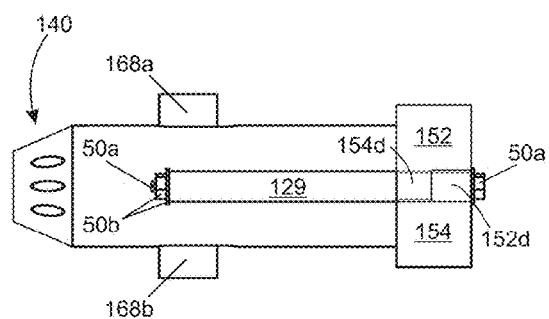
FIG. 6 is a bottom plan view of the dust shroud assembly originally introduced in FIG. 1.
Figure 7:
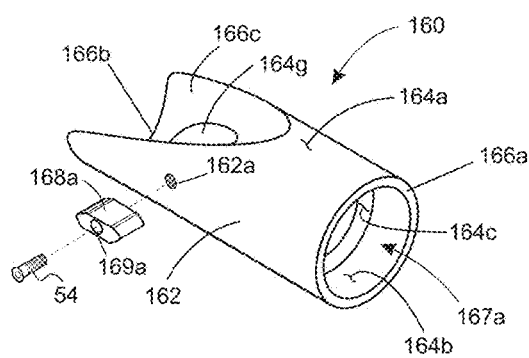
FIG. 7 is an upper-left-front isometric view (with components 168a and 54 shown exploded) of a dust shroud sleeve of the dust shroud assembly of the present invention.
Figure 8:
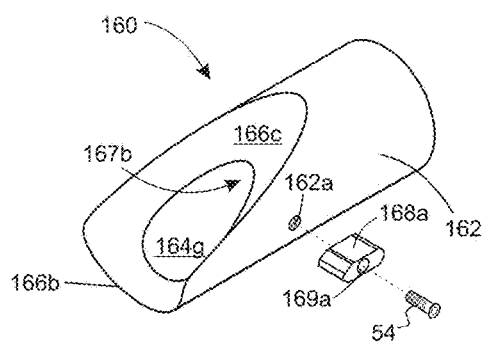
FIG. 8 is an upper-left-rear isometric view of the dust shroud sleeve originally introduced in FIG. 7.
Figure 9:
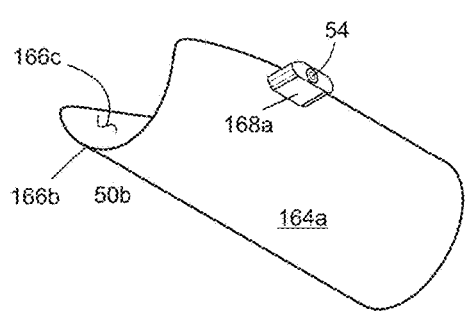
FIG. 9 is a lower-left-front isometric view of the dust shroud sleeve originally introduced in FIG. 7.
Figure 10:
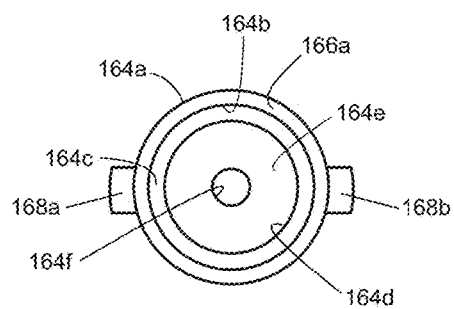
FIG. 10 is a front-end view (i.e., from proximal end 166a) of the dust shroud sleeve originally introduced in FIG. 7.

The following detailed description is merely exemplary in nature and is not intended to limit the described embodiments or the application and uses of the described embodiments. As used herein, the terms "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof, shall relate to the invention as oriented in FIG. 1. The terms "proximal end" and "front end" (or "front side") are both meant to denote the end/side closest to the working end of the chipping hammer following attachment of the dust shroud assembly thereto. Likewise, the terms "distal end" and "rear end" (or "rear side") are both meant to denote the end/side farthest away from the working end of the chipping hammer following attachment of the dust shroud thereto.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring generally to FIGS. 1-18, chipping hammer dust shroud assembly 100 (alternatively referred to herein as "dust shroud assembly 100"), generally includes a chipping hammer bit chamber 120, a vacuum port 130, an end cap 140, an attachment collar assembly 150, and a dust shroud sleeve assembly 160. Preferably, chipping hammer bit chamber 120—and more particularly, chipping bit chamber housing 122—and vacuum port 130 form a unitary (i.e., one piece or monolithic) plastic structure.

Chipping hammer bit chamber 120 is preferably provided in the form of a cylindrical chipping hammer bit chamber housing 122 having a longitudinally-extending thickened body portion 129 depending downwardly from a lower surface thereof. Chipping hammer bit chamber housing 122 is at least partially defined by an exterior surface 124a, an interior surface 124b, a proximal/front end 126a, and an opposite distal/rear end 126b. Chipping hammer bit chamber housing 122 defines an interior volume/space 127, which houses a chipping hammer bit 70 (FIG. 12) during use. Chipping hammer bit chamber housing 122 further houses dust shroud sleeve assembly 160 when dust shroud assembly 100 is in a fully assembled state.

A first elongated lateral opening 128a is provided extending completely through the left side of chipping hammer bit chamber housing 122, and a matching second elongated lateral opening 128b is provided extending completely through the right side of chipping hammer bit chamber housing 122. Preferably, the first and second elongated openings, 128a and 128b, respectively, are 180° radially offset from one another. As described in further detail herein, the first and second elongated lateral openings, 128a and 128b, are sized and shaped for accommodating receipt, or passage, of respective first and second dust shroud sleeve biasing members, 168a and 168b, therethrough.

Exterior surface 124a of chipping hammer bit chamber housing 122 has a thickened body portion 129 extending longitudinally (i.e., extending parallel to the central axis X1 (FIG. 17) of dust shroud assembly 100) from a proximal end 129a to an opposite distal end 129b thereof. A central, linear channel 129c, or opening, is provided extending longitudinally completely through thickened body portion 129, from proximal end 129a to distal end 129b.

Vacuum port 130 is preferably provided in the form of a cylindrical vacuum port housing 132. Vacuum port housing 132 is at least partially defined by an exterior surface 134a, an interior surface 134b, a proximal end 136a, and a distal end 136b where vacuum port housing 132 and chipping hammer bit chamber housing 122 are adjoined to each other. Preferably, chipping hammer bit chamber housing 122 and vacuum port housing 132 are formed as a one-piece, unitary, monolithic structure. Furthermore, distal end 136b of vacuum port housing 132 surrounds vacuum port opening 128c extending completely through the upper side of chipping hammer bit chamber housing 122. Vacuum port housing 132 defines an interior volume/space 137, which is open to the interior volume 127 of chipping hammer bit chamber housing 122 via vacuum port opening 128c. In other words, the interior volume 127 of chipping hammer bit chamber housing 122 and the interior volume 137 of vacuum port housing 132 are in fluid communication with one another. During use, a vacuum is applied to the proximal end 136a of vacuum port housing 132 in order to urge dust and debris from a workpiece into end cap 140, into interior volume 127 of chipping hammer bit chamber housing 122, through the interior volume 137 of vacuum port housing 132, and finally into a debris collection container (not shown) that may be attached to the proximal end 136a of vacuum port housing 132.

As best shown in FIGS. 13-16, end cap 140, which is releasably attachable to the distal end 126b of chipping hammer bit chamber housing 122, is preferably provided in the form of a frustroconical end cap body 142 having a recessed (i.e., reduced exterior diameter) proximal portion 142a. Frustroconical end cap body 142 is at least partially defined by exterior surface 144a, exterior surface 144b, interior surface 144c, proximal end 146a, opposite distal end 146b, and shoulder 146c adjoining end cap exterior surfaces 144a and 144b. A plurality of radially spaced apertures 148 may be provided extending completely through the sidewall of end cap body 142. The proximal end 146b of end cap body 142 defines a front/proximal end cap opening 147. As will be apparent to those skilled in the relevant art, the alternative embodiments of end cap body 142 (e.g., having different geometries) could be employed without departing from the intended scope of the invention.

Figures 11, 12:
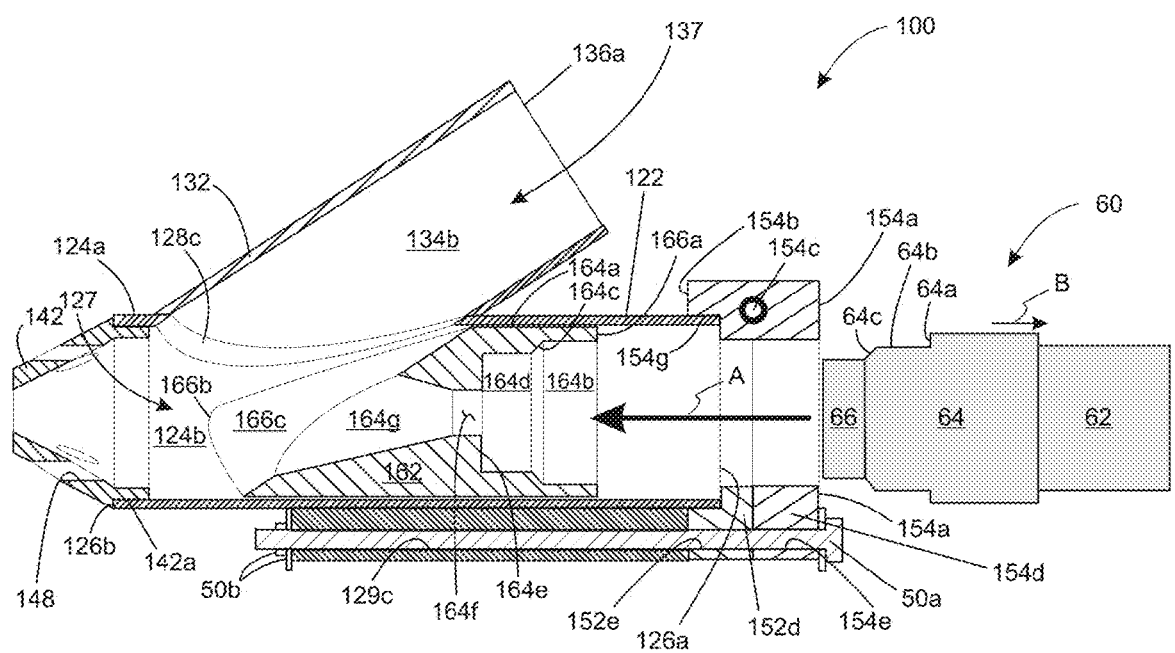
FIG. 11 is a cross-sectional view taken along section line 11-11 of FIG. 5, further illustrating quick change chipping hammer drill chuck 60 prior to assembly of the dust shroud assembly 100 thereabout.
FIG. 12 is a cross-sectional view as introduced in FIG. 11, further illustrating quick change chipping hammer drill chuck 60 and chipping hammer bit 70 following assembly of the dust shroud assembly 100 thereabout.
Figure 13:
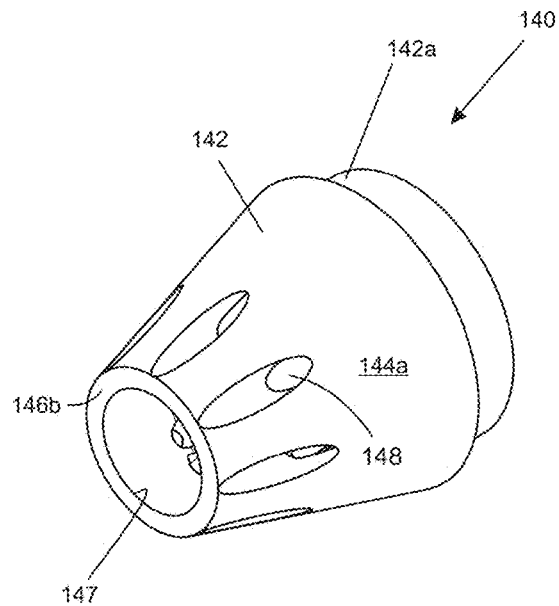
FIG. 13 is an upper-left-front isometric view of end cap 140.
Figure 14:
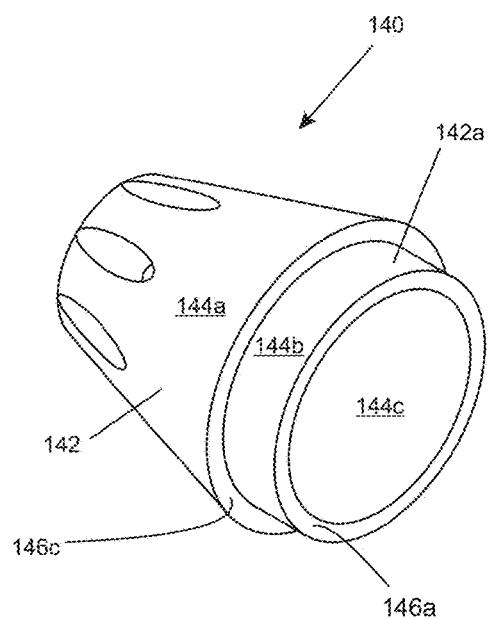
FIG. 14 is an upper-left-rear isometric view of the end cap 140 introduced in FIG. 13.
Figure 15:
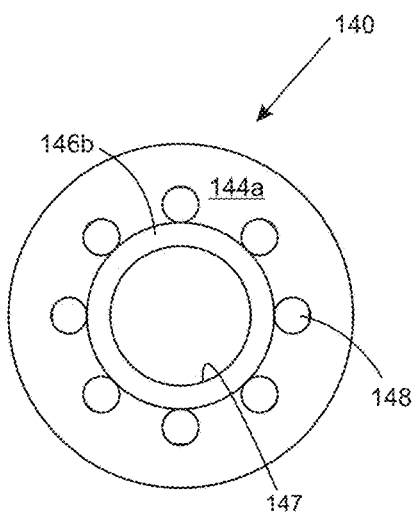
FIG. 15 is rear end view (i.e., from the proximal end) of the end cap 140 introduced in FIG. 13.
Figure 16:
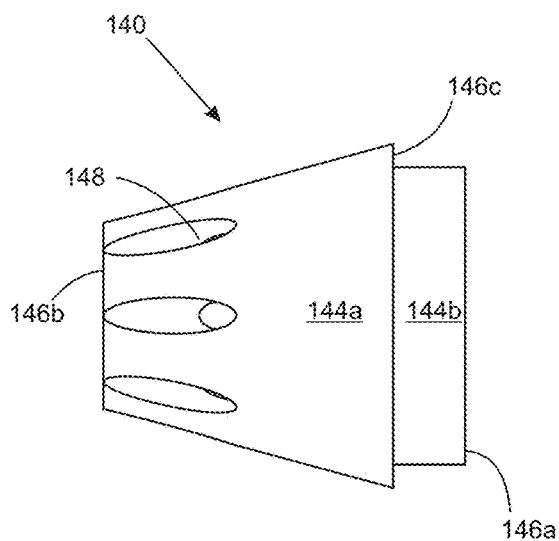
FIG. 16 is a left side elevation view of the end cap 140 introduced in FIG. 13.
Figure 17:
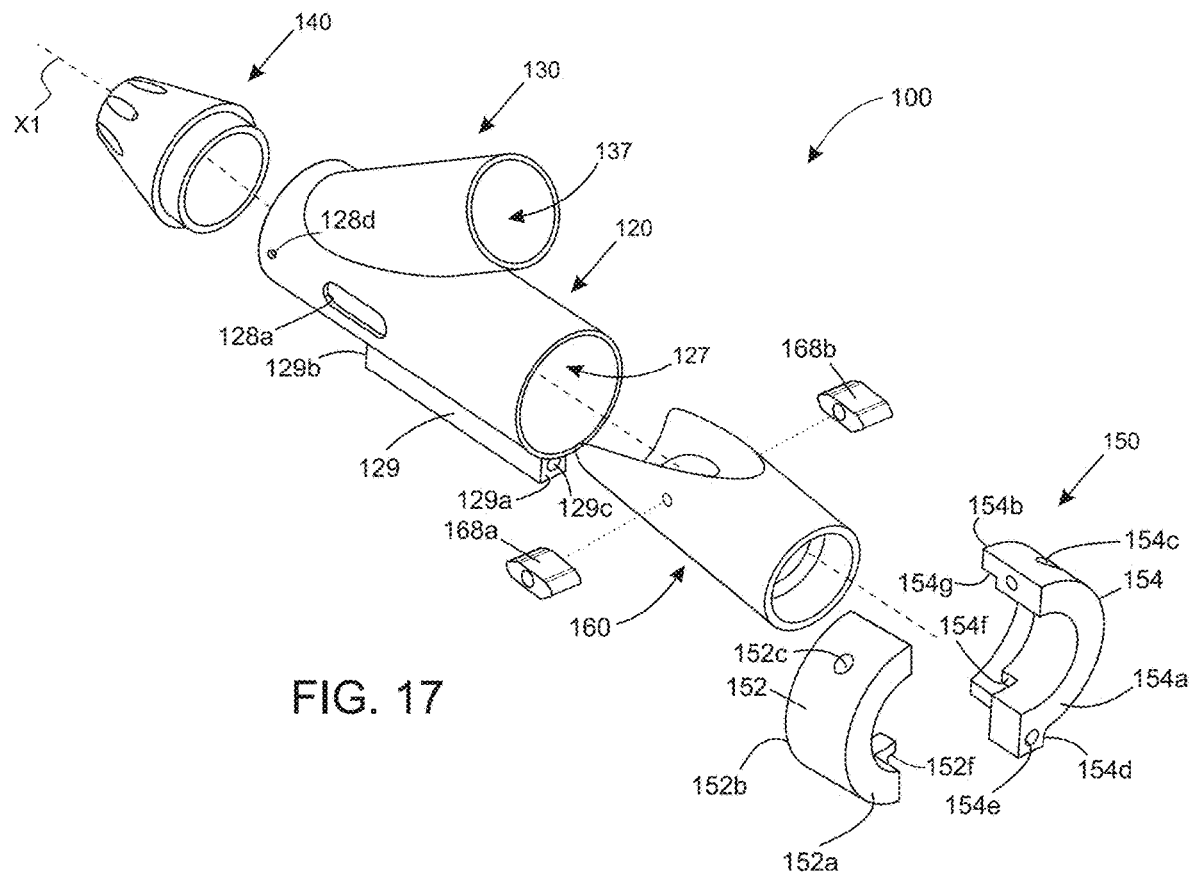
FIG. 17 is an upper-left-rear isometric exploded view of dust shroud assembly 100, with all of the mechanical fastener components removed for clarity.

As best shown in FIGS. 11 and 17, while assembling dust shroud assembly 100, recessed proximal portion 142a of end cap body 142 may be frictionally fitted into interior space 127 of chipping hammer bit chamber housing 122 through distal end 126b. That is, when recessed portion 142a of end cap body 142 is inserted into interior space 127, the exterior surface 144b of end cap sidewall recessed proximal portion 142a preferably makes frictional contact with interior surface 124b of chipping hammer bit chamber housing 122. In addition to, or instead of, the aforementioned frictional fit, set screws 52 may be inserted through one or more set screw apertures 128d in chipping hammer bit chamber housing 122 until applying pressure against exterior surface 124a. In this manner, the set screw(s) 52 may be used to more securely attach end cap 140 to chipping hammer bit chamber housing 122. As will be apparent to those skilled in the relevant art, other means for securing end cap 140 in place may be employed without departing from the intended scope of the invention. For instance, individual parts of a conventional 2-part lock clasp buckle latch system may be secured to exterior surface 124a of the chipping hammer bit chamber housing 122 and adjacent exterior surface 144a of end cap body 142.

During use, vacuum applied to vacuum port 130 may urge dust and debris through the end cap opening 147 defined at distal end 146b by interior surface 144c. Furthermore, the vacuum created within vacuum port 130 may urge dust and debris through the radially spaced apertures 148 of end cap 140, through the interior volume 137 of vacuum port housing 132, and into the aforementioned debris collection body.

An attachment collar assembly 150 may be provided for releasably securing dust shroud assembly 100 to the working end of a conventional chipping hammer (not shown) and about a quick-change chipping hammer drill chuck 60. As will be appreciated by those skilled in the relevant art, a variety of different attachment collar configurations could be employed for this purpose without departing from the intended scope of the invention.

As best shown in FIG. 17, in an exemplary implementation, attachment collar assembly 150 is comprised of a C-shaped left attachment collar 152 that cooperates with a corresponding C-shaped right attachment collar 154. Left attachment collar 152 has a geometry defined by a proximal end 152a, an opposite distal end 152b, a laterally extending aperture/channel 152c through an upper portion of the left attachment collar, a thickened lower portion 152d, a longitudinally extending aperture 152e through thickened lower portion 152d, and a notched portion 152f at a lower end of the left attachment collar. Right attachment collar 154 has a geometry defined by a proximal end 154a, an opposite distal end 154b, a laterally extending aperture/channel 154c through an upper portion of the right attachment collar, a thickened lower portion 154d, a longitudinally extending aperture 154e through thickened lower portion 154d, and a notched portion 154f at a lower end of the right attachment collar that mates with the corresponding notched portion 152f of left attachment collar 152. At its distal end 154b, right attachment collar 154 defines an interiorly recessed distal edge portion 154g that partially seats around the proximal end 126a of chipping hammer bit chamber housing 122 during coupling of the attachment collar assembly 150 to the chipping hammer bit chamber 120. As described in greater detail below, while coupling dust shroud assembly 100 to the working end of a chipping hammer, left and right attachment collars, 152 and 154, respectively, may be rotationally mechanically secured to one another and to longitudinally-extending thickened body portion 129 of chipping hammer bit chamber housing 122, using conventional mechanical components such as threaded bolt 50a and washer/nut combination 50b.

As best shown in FIGS. 7-10, a dust shroud sleeve assembly 160 may be provided, including a dust shroud sleeve body 162, a left dust shroud sleeve biasing member 168a, a right dust shroud sleeve biasing member 168b, and a pair of threaded fasteners 54 for attaching the dust shroud sleeve biasing members 168a, 168b to an exterior surface of dust shroud sleeve body 162.

Preferably, dust shroud sleeve body 162 is constructed as a unitary (i.e., one-piece, monolithic) cylindrical molded plastic member. Dust shroud sleeve body 162 extends longitudinally between proximal end 166a (alternatively referred to herein as "proximal edge 166a") and opposite distal end 166b (alternatively referred to herein as "distal edge 166b"). Dust shroud sleeve body 162 has an exterior surface geometry at least partially defined by exterior surface 164a and concave parabolic distal end cut 166c (alternatively referred to herein as "concave parabolic distal end notch 166c").

Proximally, dust shroud sleeve body 162 has an interior cavity 167a (FIG. 7) designed to conform, at least partially, to exterior surfaces of bit shank receiving portion 66 and (a distal portion of) retractable collar 64 of quick-change chipping hammer drill chuck 60. The proximal interior cavity 167a of dust shroud sleeve body 162 is at least partially defined by interior annular surface 164b, reduced diameter interior annular surface 164d, interiorly tapering annular surface 164c adjoining interior annular surfaces 164b and 164d, and interior vertical end wall surface 164e. Distally, dust shroud sleeve body 162 has an interior cavity 167b designed to guide and align a shank portion 72 of a chipping hammer bit 70 during insertion of the chipping hammer bit through the dust shroud sleeve body. The distal interior cavity 167b of dust shroud sleeve body 162 is at least partially defined by interiorly-tapering guide opening 164g and interior alignment opening 164f, wherein the interior surface of the guide opening transitions interiorly into the alignment opening. This interior surface geometry of the dust shroud sleeve body 162 is a significant feature of the present invention. To wit, the interiorly-tapering guide opening 164g facilitates the insertion of the shank portion 72 of a chipping hammer bit 70 into interior alignment opening 164f by guiding it toward the alignment opening. As a result, the shank portion 72 of a chipping hammer bit 70 may be easily inserted through distal opening 147 of end cap body 142 and into interior alignment opening 164f of dust shroud sleeve body 162 without requiring a user to carefully align the bit shank with the alignment opening 164f in order to feed the bit shank into the quick change chipping hammer drill chuck bit shank receiving portion 66 of quick change chipping hammer drill chuck 60.

Dust shroud sleeve body 162 preferably includes a left threaded fastener receiving aperture 162a and an opposite right threaded fastener receiving aperture 162b in exterior surface 164a. In order to enable manual manipulation of dust shroud sleeve body 162 during use, a pair of dust shroud sleeve biasing members 168a, 168b are provided. During assembly of dust shroud assembly 100, left dust shroud sleeve biasing member 168*a* and right dust shroud sleeve biasing member 168*b* are attached to dust shroud sleeve body 162 using threaded fasteners 54. A first threaded fastener 54 is inserted through laterally extending aperture 169*a* in left dust shroud sleeve biasing member 168*a* and threaded into left threaded fastener receiving aperture 162*a* of dust shroud sleeve body 162. A second threaded fastener 54 is inserted through laterally extending aperture 169*b* in right dust shroud sleeve biasing member 168*b* and threaded into right threaded fastener receiving aperture 162*b* of dust shroud sleeve body 162. As described in greater detail below, rearward translation of the left and right dust shroud sleeve biasing members, 168*a* and 168*b*, respectively, enables removal of chipping hammer bits from, and insertion of chipping hammer bits into, a quick-change chipping hammer drill chuck 60 of a conventional chipping hammer.

Referring now particularly to FIG. 11, the dust shroud assembly 100 is depicted prior to its assembly about a quick-change chipping hammer drill chuck 60 of a conventional chipping hammer. The construction and operation of chipping hammer drill chucks is well known. The representative chipping hammer drill chuck 60 includes a main body 62, a retractable collar 64, and a bit shank receiving portion 66. Furthermore, as shown, quick change chipping hammer drill chuck retractable collar 64 may have a geometry at least partially defined by a forward-facing shoulder 64*a*, an exterior surface 64*b*, and a bullnose exterior surface 64*c*.

In FIG. 11, although dust shroud assembly 100 is depicted with attachment collar assembly 150 secured to proximal end 126*a* of chipping hammer bit chamber housing 122, it will be apparent that left and right attachment collars, 152 and 154, respectively, would not actually be fully assembled to one another until after quick change chipping hammer drill chuck 60 has been received into proximal interior cavity 167*a* of dust shroud sleeve housing 162 (as shown in FIG. 12).

Significantly, when quick change chipping hammer drill chuck 60 is received into proximal interior cavity 167*a* of dust shroud sleeve housing 162 (see FIG. 12), as indicated by arrow A, the exterior surface of drill chuck bit shank receiving portion 66 may contact interior surface 164*d* of dust shroud sleeve body 162, bullnose exterior surface 64*c* of drill chuck retractable collar 64 may contact inwardly-tapered surface 164*c* of dust shroud sleeve body 162, and forward-facing shoulder 64*a* of drill chuck retractable collar 64 may contact proximal end 166*a* of dust shroud sleeve body 162.

As previously noted, a crucial feature, or characteristic, of the dust shroud assembly 100 of the present invention is that it enables a chipping hammer operator to attach and detach chipping hammer bits 70 without first requiring detachment/disassembly of the dust shroud assembly 100 from the working end of a chipping hammer. When the dust shroud assembly 100 is in a fully assembled state and assembled about, or around, quick change chipping hammer drill chuck 60 (as depicted in FIG. 12) an operator can easily and efficiently bias drill chuck retractable collar 64 in a rearward direction (as indicated by arrow B), by simply urging dust shroud sleeve body 162 rearwardly via left and right dust shroud sleeve biasing members, 168*a* and 168*b*, respectively. By doing so, proximal end 166*a* of dust shroud sleeve body 162 urges retractable collar 64 rearwardly so that quick change chipping hammer drill chuck bit shank receiving portion 66 is biased into an open state/condition for receiving a bit shank or removing a bit shank from the quick change chipping hammer drill chuck. While in this retracted state, an operator may easily and efficiently remove a chipping hammer bit 70 from, or insert a chipping hammer bit into, quick change chipping hammer drill chuck bit shank receiving portion 66 without having to remove the dust shroud assembly 100 from the working end of the chipping hammer.

Figure 18:
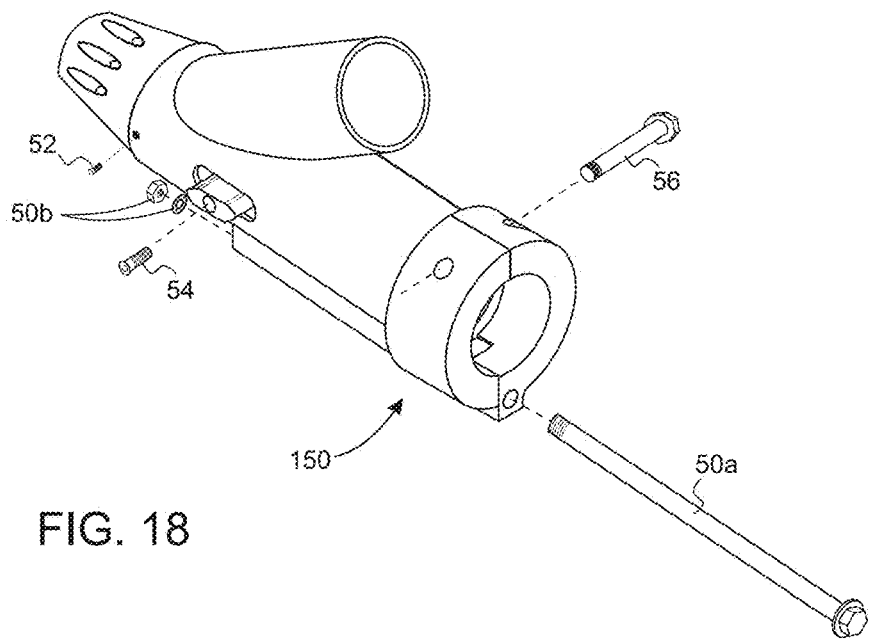
FIG. 18 is an upper-left-rear isometric assembled view of dust shroud assembly, with all of the mechanical fastener components shown exploded for clarity.

Referring now to FIGS. 17 and 18, the assembly of dust shroud assembly 100 about a quick change chipping hammer drill chuck 60 will now be described in greater detail. Initially, it should be noted that end cap 140 may be releasably attached to the distal end 126*b* of chipping hammer bit chamber housing 122 at any stage of the assembly process. With regard to the exemplary implementation, recessed proximal portion 142*a* of end cap body/sidewall 142 may be frictionally fitted with distal end 126*b* of chamber housing 122 (as best shown in FIG. 11), and then further secured with a set screw 52 inserted through set screw receiving aperture 128*d* of chipping hammer bit chamber housing 122 (as best shown in FIG. 18).

Dust shroud sleeve body 162 may be slidingly inserted (distal end 166*b* first) into interior volume 127 of chipping hammer bit chamber housing 122 via proximal end 126*a*, until threaded fastener receiving apertures 162*a* and 162*b* in exterior surface 164*a* of dust shroud sleeve body 162 are visible through corresponding first and second elongated lateral openings, 128*a* and 128*b*, in chipping hammer bit chamber housing 122. Subsequently, left and right dust shroud biasing members, 168*a* and 168*b*, may be assembled to opposite sides of dust shroud sleeve body 162 using a pair of threaded fasteners 54. In particular, laterally extending aperture 169*a* through left dust shroud sleeve biasing member 168*a* may be aligned with threaded fastener receiving aperture 162*a* in exterior surface 164*a* of dust shroud sleeve body 162, and then threaded fastener 54 threadingly inserted through the aligned apertures. Similarly, laterally extending aperture 169*b* through right dust shroud sleeve biasing member 168*b* may be aligned with threaded fastener receiving aperture 162*b* in exterior surface 164*a* of dust shroud sleeve body 162, and then threaded fastener 54 threadingly inserted through the aligned apertures.

Subsequently, attachment collar assembly 150 may be partially assembled to the proximal end 126*a* of chipping hammer bit chamber housing 122. Left attachment collar 152 and right attachment collar 154 may be fitted together (as best shown in FIG. 18) such that longitudinally extending aperture 152*e* (FIG. 11) through thickened lower portion 152*d* of left attachment collar 152, and longitudinally extending aperture 154*e* through thickened lower portion 154*d* of right attachment collar 154, are aligned with one another. Then, aligned apertures 152*e* and 154*e* may be aligned with central channel 129*c* extending completely through linearly-extending thickened body portion 129, and threaded bolt 50*a* sequentially inserted through aperture 154*e*, aperture 152*e*, and channel 129*c*. With threaded bolt 50*a* extending completely through channel 129*c*, nut and washer components 50*b* may be attached to the distal end of the threaded bolt. In this state, left and right attachment collars, 152 and 154, are loosely secured about proximal end 126*a* of chipping hammer bit chamber housing 122 such that they can both be counter-rotated about threaded bolt 50*a*, away from one another, to enable insertion of quick change chipping hammer drill chuck bit shank receiving portion 66 and retractable collar 64 through the proximal end of chamber housing 122, and subsequently into the proximal interior cavity 167*a* of dust shroud sleeve housing 162.

Subsequently, left and right attachment collars, 152 and 154, may be counter-rotated about threaded bolt 50*a*, toward one another, until they are secured about both the proximal end 126a of chipping hammer bit chamber housing 122 and main body 62 of quick change chipping hammer drill chuck 60 (as best shown in FIG. 12). Finally, threaded fastener 56 may be threadingly received through aligned, laterally-extending apertures 152c and 154c of respective left and right attachment collars 152 and 154 to secure dust shroud assembly 100 about quick change chipping hammer drill chuck 60 at the working end of a chipping hammer.

In this fully-assembled state, a chipping hammer operator may selectively retract quick change chipping hammer drill chuck retractable collar 64, by rearwardly biasing dust shroud sleeve body 162 via left and right dust shroud sleeve biasing members 168a and 168b. In this retracted state, an operator may easily and efficiently insert the shank portion 72 of a chipping hammer bit 70 into drill chuck 60 or, alternatively, release the shank portion from the drill chuck.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is not intended that the invention be limited to the particular embodiments disclosed as the best mode contemplated for carrying out this invention, but that the invention will include all the embodiments falling within the scope of the appended claims.

What is claimed is:

1. A dust shroud assembly releasably attachable about a drill chuck at the working end of a chipping hammer, the dust shroud assembly comprising:
    a chipping hammer bit chamber housing oriented longitudinally along a central axis thereof;
    a vacuum port housing extending outwardly from the chipping hammer bit chamber housing;
    an end cap releasably attached to a distal end of the chipping hammer bit chamber housing;
    a dust shroud sleeve body contained within an interior of the chipping hammer bit chamber housing, the dust shroud sleeve body oriented longitudinally along said central axis and having a proximal end configured for selectively engaging a retractable collar of a quick change chipping hammer drill chuck at the working end of the chipping hammer;
    at least one dust shroud sleeve biasing member extending outwardly from the dust shroud sleeve body and protruding through a corresponding elongated lateral opening in the chipping hammer bit chamber housing; and
    an attachment collar assembly releasably attachable to a proximal end of the chipping hammer bit chamber housing to secure the chipping hammer bit chamber housing to the working end of the chipping hammer about the quick change chipping hammer drill chuck,
    wherein, upon translating the dust shroud sleeve rearwardly toward the working end of the chipping hammer, via the at least one dust shroud sleeve biasing member protruding exteriorly through the longitudinal slot in the chipping hammer bit chamber housing, the proximal end of the dust shroud sleeve engages the retractable collar of the quick change chipping hammer drill chuck in such a manner that the retractable collar is biased into an open state for receiving a shank portion of a chipping hammer bit into the quick change chipping hammer drill chuck or for removing a shank portion of a chipping hammer bit from the quick change chipping hammer drill chuck.

2. The dust shroud assembly of claim 1, wherein the chipping hammer bit chamber housing is cylindrical and is further defined by an open proximal end, an open distal end opposite the open proximal end, an interior surface, and an opposite exterior surface.

3. The dust shroud assembly of claim 2, wherein the vacuum port housing is cylindrical and is further defined by an open proximal end, an open distal end opposite the open proximal end, an interior surface and an exterior surface, the distal end of the vacuum port housing circumscribing a vacuum port opening provided through a sidewall of the chipping hammer bit chamber housing, such that an interior of the vacuum port housing is in fluid communication with an interior of the chipping hammer bit chamber housing.

4. The dust shroud assembly of claim 2, further comprising a longitudinally extending thickened body portion protruding outwardly from the exterior surface of the chipping hammer bit chamber housing, the thickened body portion having a proximal end, an opposite distal end, and a central channel extending completely therethrough from the proximal end to the distal end.

5. The dust shroud assembly of claim 1, wherein the dust shroud sleeve body is further defined by a distal end configured for guiding the shank portion of the chipping hammer bit into an interior alignment opening of the dust shroud sleeve.

6. The dust shroud assembly of claim 5, wherein the distal end configuration of the dust shroud sleeve body is defined by an inwardly tapering concave parabolic distal end cut.

7. The dust shroud assembly of claim 1, wherein said at least one dust shroud sleeve biasing member further comprises a left dust shroud sleeve biasing member and a right dust shroud sleeve biasing member radially offset from the left dust shroud sleeve biasing member, the left and right dust shroud sleeve biasing members extending outwardly from the dust shroud sleeve body and protruding through respective left and right elongated lateral openings in the chipping hammer bit chamber housing.

8. The dust shroud assembly of claim 7, wherein the left and right dust shroud sleeve biasing members are radially offset 180 degrees from one another, and the left and right elongated lateral openings in the chipping hammer bit chamber housing are radially offset 180 degrees from one another.

9. The dust shroud assembly of claim 1, wherein the attachment collar assembly further comprises:
    a left attachment collar; and
    a right attachment collar selectively mateable with the left attachment collar.

10. The dust shroud assembly of claim 9, wherein:
    the left attachment collar has a longitudinally extending aperture through a lower portion thereof;
    the right attachment collar has a longitudinally extending aperture through a lower portion thereof; and
    the longitudinally extending apertures through the lower portions of the left and right attachment collars align with one another when the left and right attachment collars are assembled to one another.

11. The dust shroud assembly of claim 10, wherein the longitudinally extending apertures through the lower portions of the left and right attachment collars align with the central channel of the longitudinally extending thickened body portion of the chipping hammer bit chamber housing when the left and right attachment collars are assembled to the proximal end of the chipping hammer bit chamber housing.

12. The dust shroud assembly of claim 11, further comprising:
- a threaded bolt sized for insertion completely through the central channel of the thickened body portion of the chipping hammer bit chamber housing; and
- a threaded nut releasably attachable to a length of the distal end of the threaded bolt extending beyond a distal end of the thickened body portion of the chipping hammer bit chamber housing following said insertion,
- wherein, the threaded bolt may be sequentially inserted through the longitudinally extending aperture in the right attachment collar, through the longitudinally extending aperture in the left attachment collar, and through the central channel of the thickened body portion of the chipping hammer bit chamber housing, and the threaded nut subsequently fastened to the length of the threaded bolt extending beyond the distal end of the thickened body portion, in order to secure the left and right attachment collars to the proximal end of the chipping hammer bit chamber housing.

13. The dust shroud assembly of claim 9, wherein:
the left attachment collar has a laterally extending aperture through an upper portion thereof;
the right attachment collar has a laterally extending aperture through an upper portion thereof; and
the laterally extending apertures through the upper portions of the left and right attachment collars align with one another when the left and right attachment collars are assembled to one another.

14. The dust shroud assembly of claim 13, further comprising a threaded fastener receivable through the aligned laterally extending apertures in the upper portions of the respective left and right attachment collars.

15. The dust shroud assembly of claim 1, wherein the end cap releasably attached to the distal end of the chipping hammer bit chamber housing has a generally frustroconical shape.

16. The dust shroud assembly of claim 15, wherein a proximal end of the frustroconical end cap is further defined by a recessed exterior surface portion, the recessed exterior surface portion frictionally fitting within the open distal end of the chipping hammer bit chamber housing during assembly thereto.

17. The dust shroud assembly of claim 1, wherein the end cap has a series of apertures extending completely through a sidewall thereof.

* * * * *